United States Patent [19]

Flocchini

[11] 4,408,564
[45] Oct. 11, 1983

[54] MILKING APPARATUS

[76] Inventor: Andrew J. Flocchini, 7050 Lakeville Hwy., Petaluma, Calif. 94952

[21] Appl. No.: 210,701

[22] Filed: Nov. 26, 1980

Related U.S. Application Data

[62] Division of Ser. No. 60,253, Jul. 23, 1979, Pat. No. 4,263,874.

[51] Int. Cl.³ .............................. A01J 5/04; A01J 9/08
[52] U.S. Cl. ................................................. 119/14.08
[58] Field of Search .............. 119/14.08, 14.01, 14.03, 119/14.04, 14.45, 14.1

[56] References Cited

U.S. PATENT DOCUMENTS

| | | | |
|---|---|---|---|
| 3,603,292 | 9/1971 | Finch | 119/14.1 |
| 3,738,321 | 6/1973 | Hicks | 119/14.45 |
| 3,973,520 | 8/1976 | Flocchini | 119/14.08 |
| 4,005,680 | 2/1977 | Lole | 119/14.08 |

Primary Examiner—Hugh R. Chamblee
Attorney, Agent, or Firm—Townsend and Townsend

[57] ABSTRACT

An improved milking station is disclosed including an improved sensor for indicating premature teat cup disengagement, an improved shut-off valve mechanism, and a teat cup retraction assembly. In the outflow line of milk from the teat cup assembly, a plug with a magnet therein is gravitationally biased between the limit of travel bars. Assuming normal milk exhaustion from a cow's udder, the magnet falls to a lower position for a predetermined period of time (in the order of 4-6 seconds) and actuates the shut-off valve and retracts the teat cup assembly. When premature disengagement of the teat cup assembly occurs (as by the cow kicking the assembly loose), and the teat cup becomes disengaged, vacuum pulls the plug with the magnet in the outflow conduit to the full-up position. In the full-up position, retraction occurs with a blinking light indicating that disengagement has occurred without necessarily fully draining the cow's bag. Milk shut-off occurs between the teat cup assembly and vacuum manifold by a rubber hose flattened against a T-shaped anvil inserted within the hose. The anvil is positioned with the hose surrounding it between compression members. By squeezing the hose sides downwardly onto the anvil, complete sealing occurs without straining the hose size beyond the elastic limit. Teat cup retraction is actuated at the end of an air cylinder having a gathering point initially over the side of the cow. When retraction is called for, the teat cup assembly is retracted from the cow and lifted immediately upward and forward of the animal. Only after upward and forward motion has commenced, is the teat cup assembly pulled inward into the center of the milking station. Swatting of the animal with the teat cup assembly either in the milk stall or in the adjacent stall is avoided.

2 Claims, 9 Drawing Figures

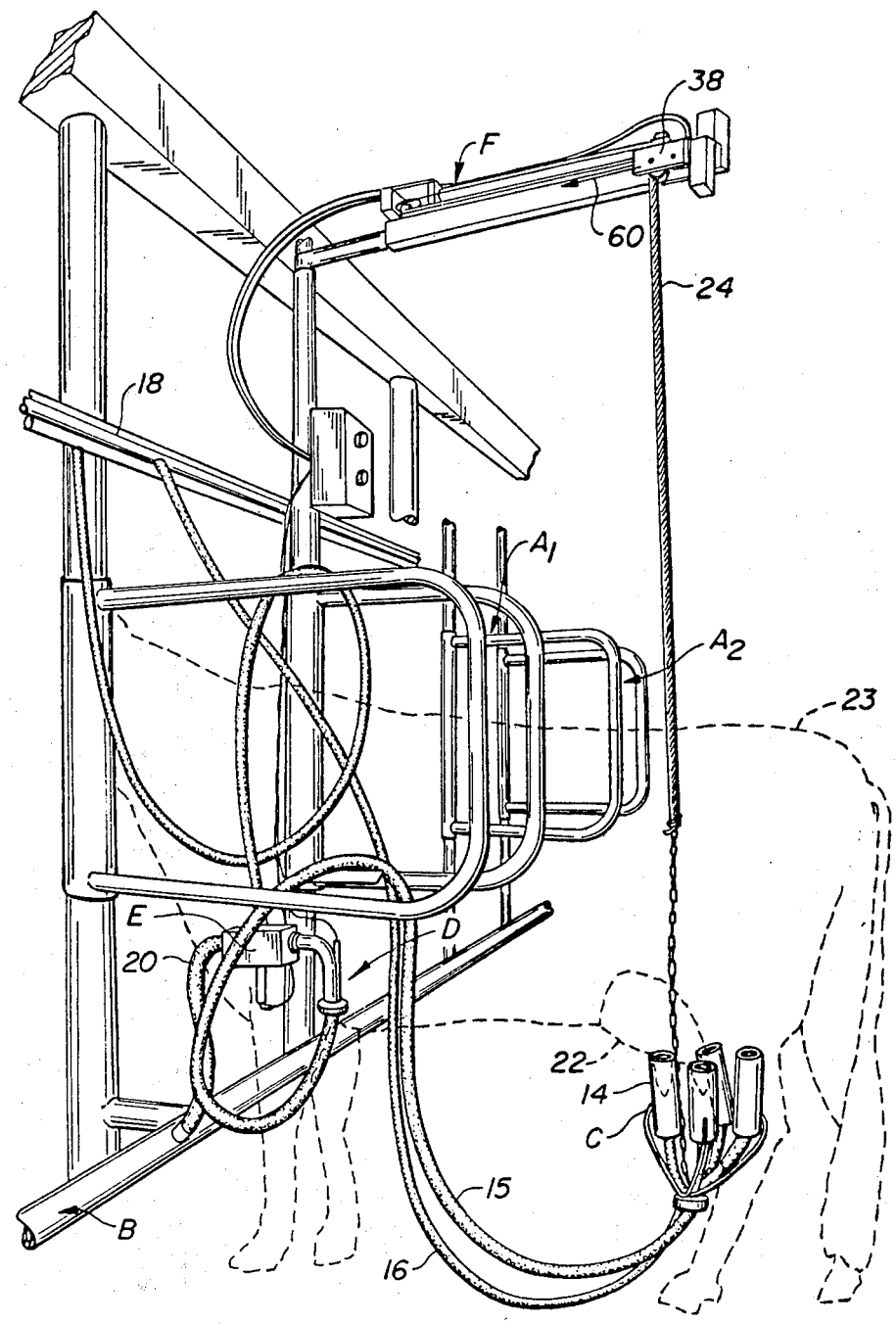
FIG._1.

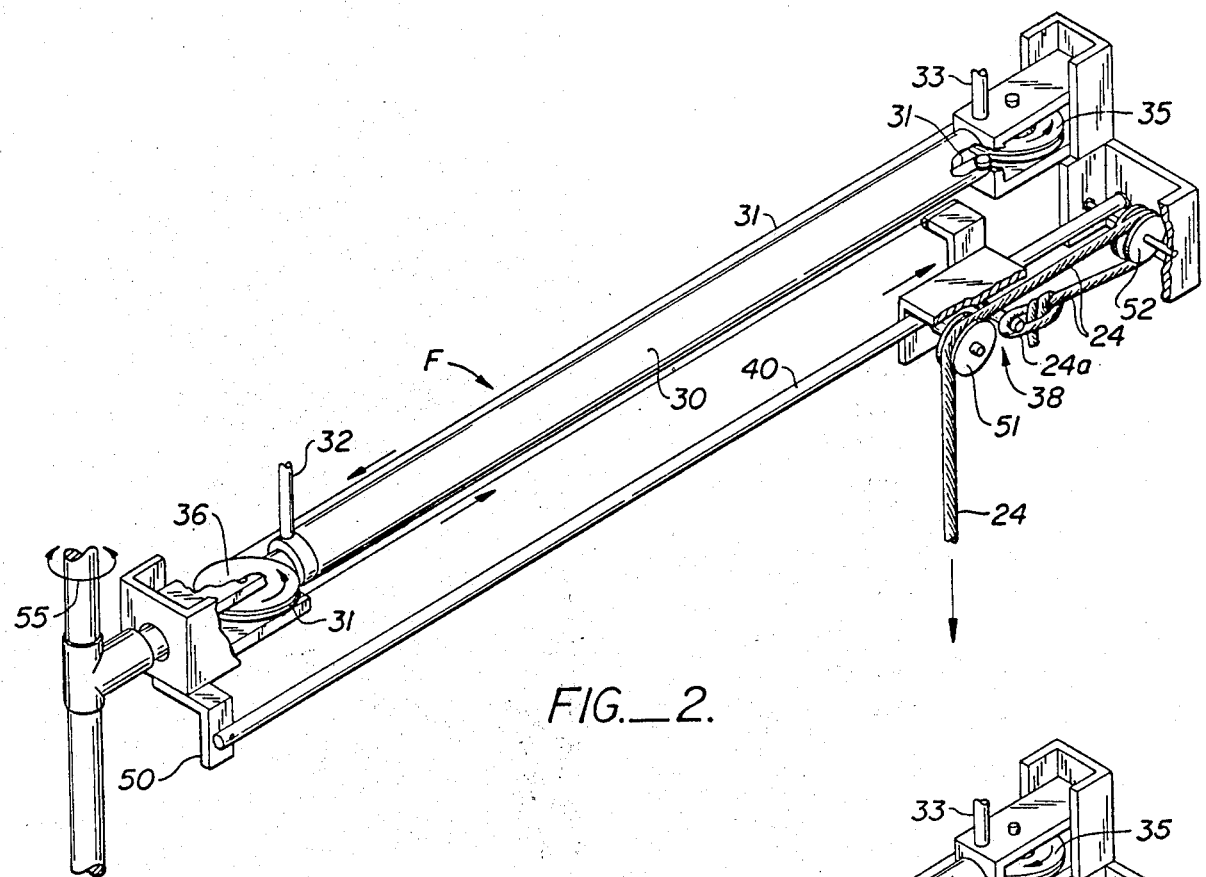
FIG._2.
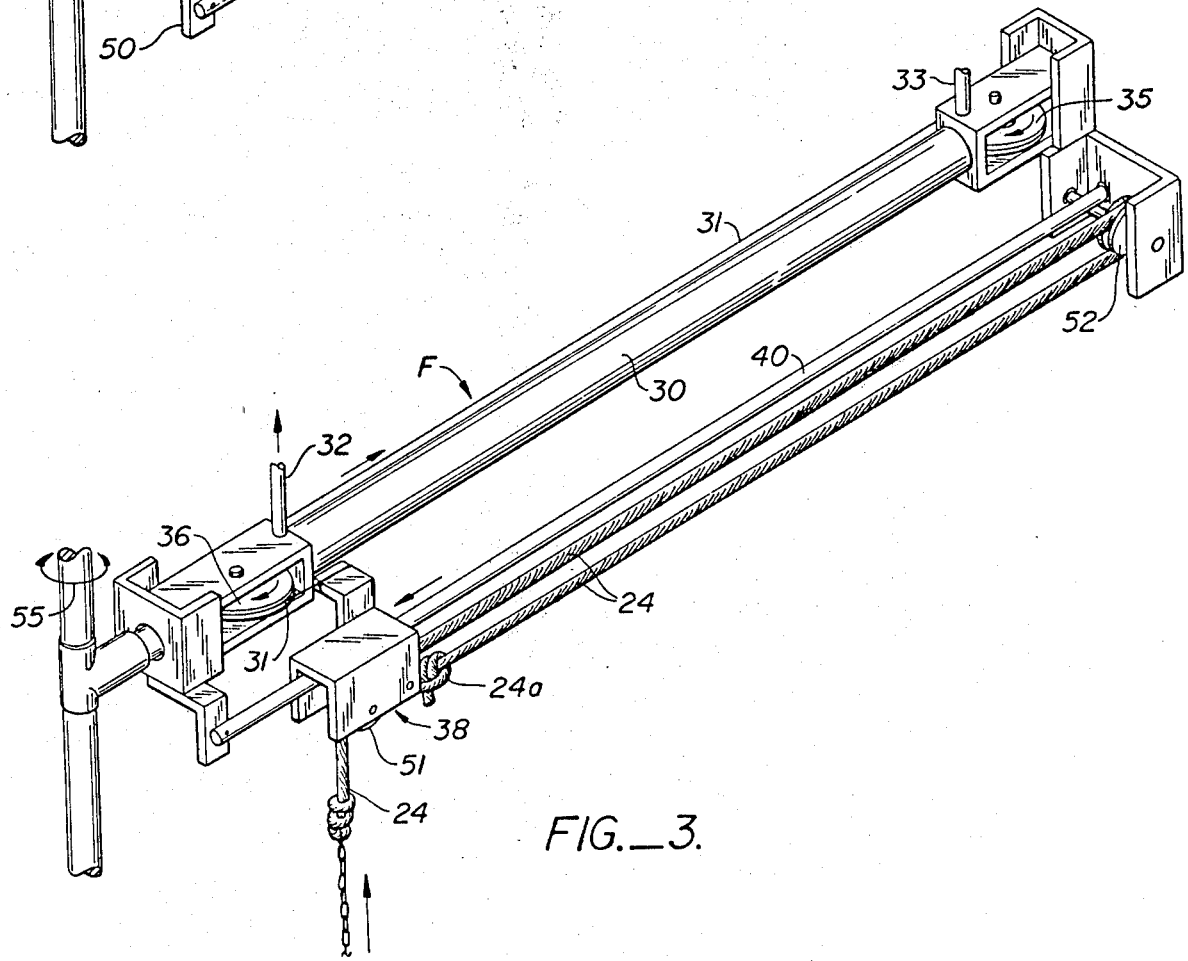
FIG._3.

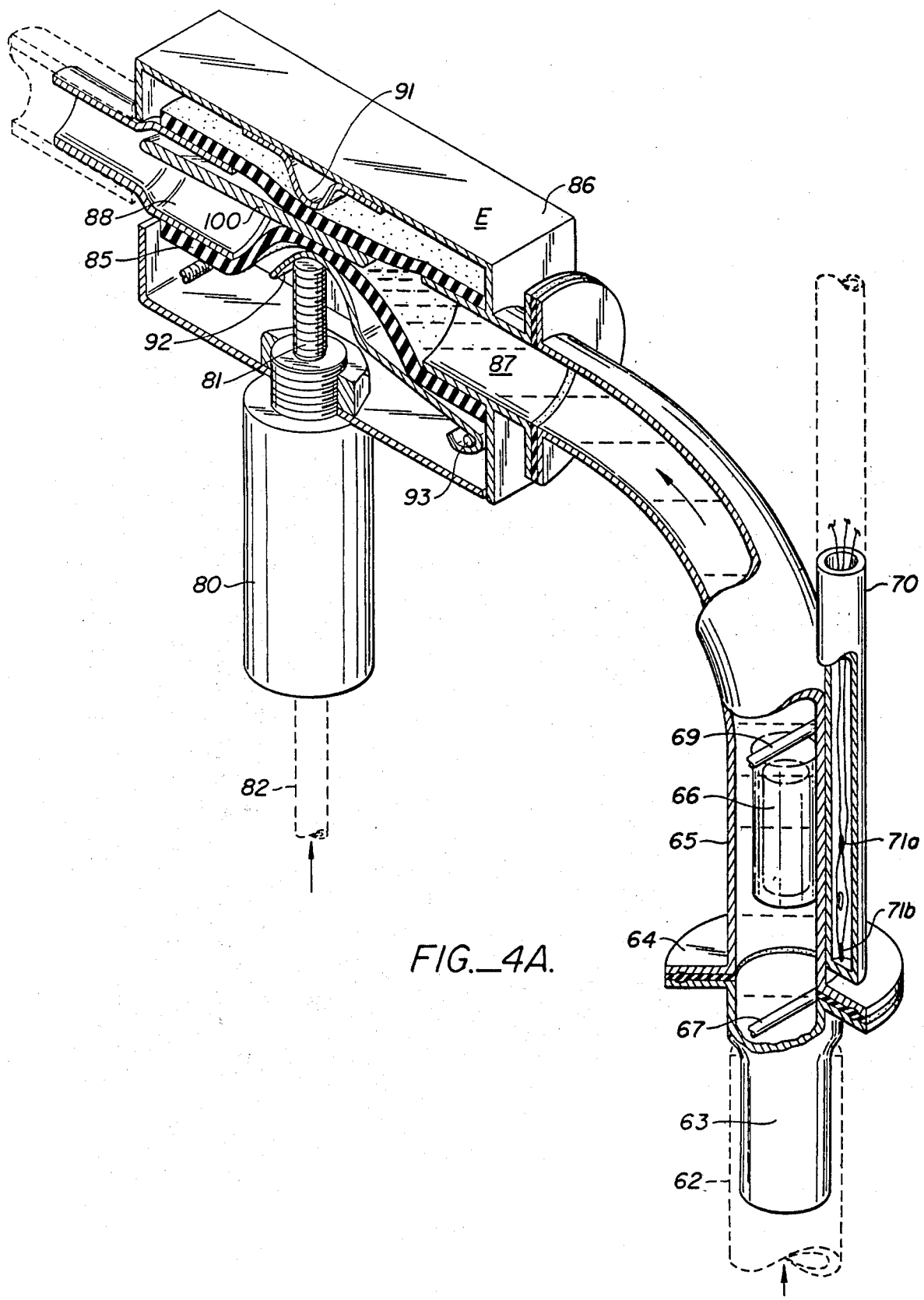
FIG._4A.

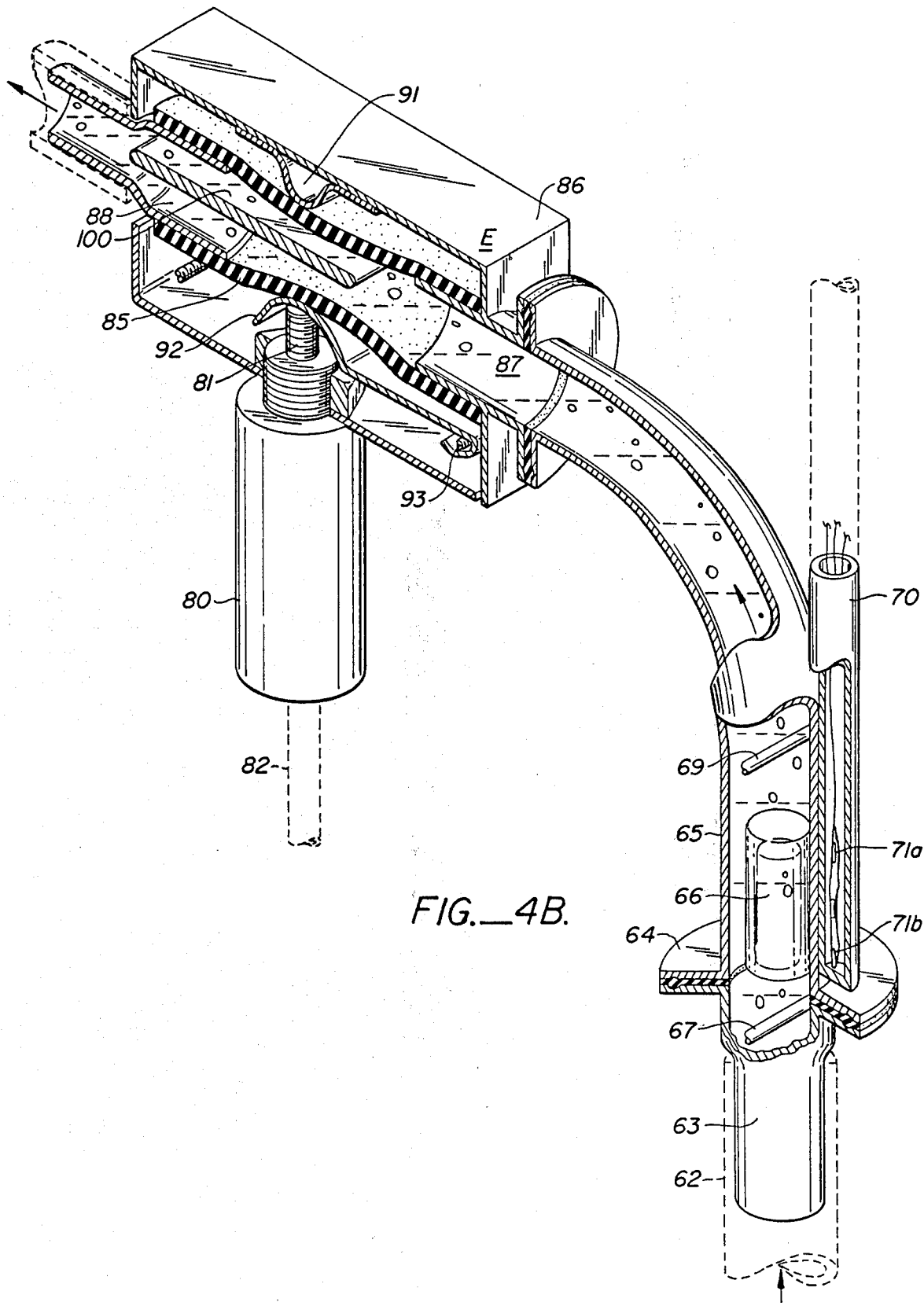
FIG._4B.

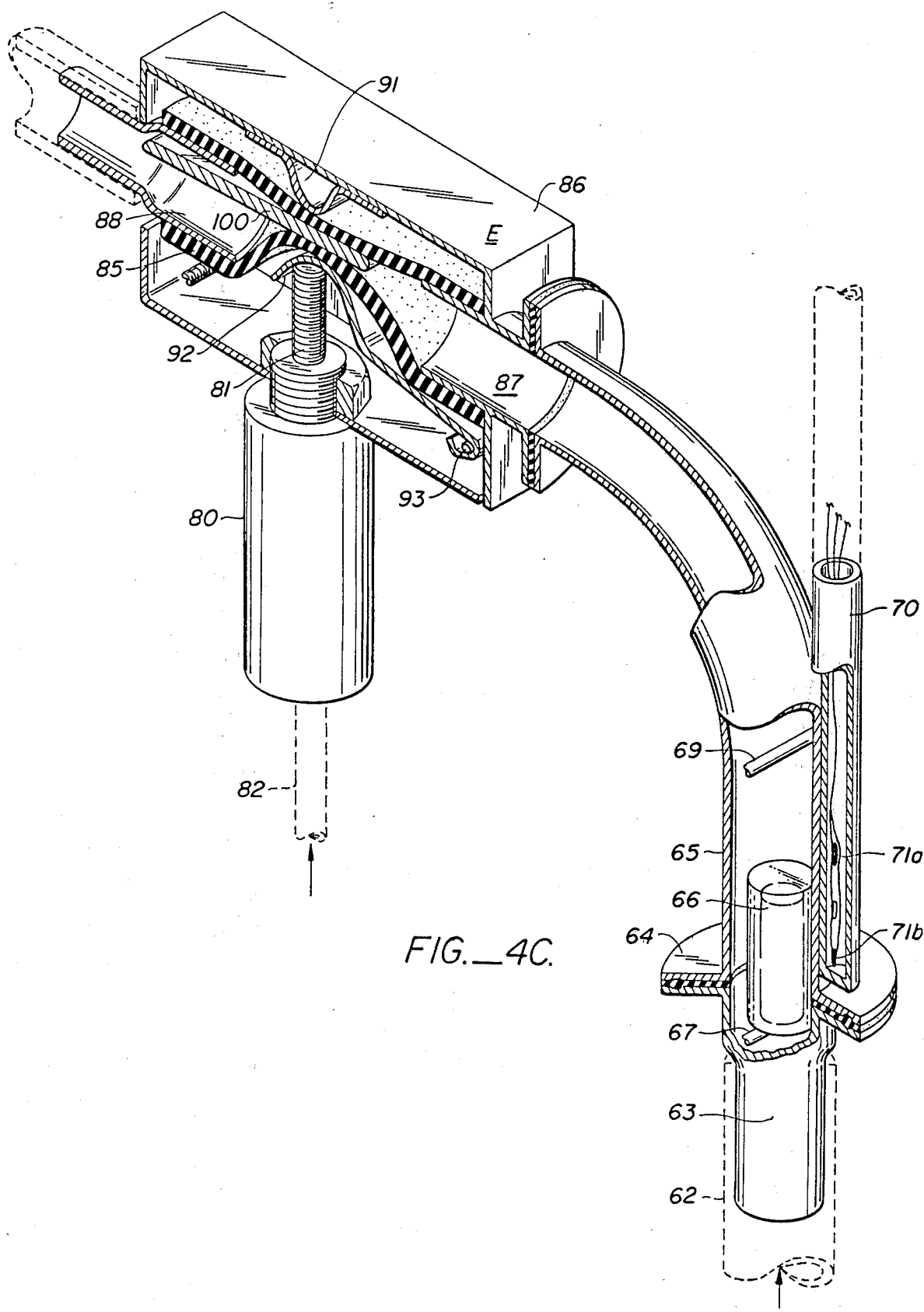
FIG._4C.

MILKING APPARATUS

This is a division of application Ser. No. 60,253, filed July 23, 1979, now U.S. Pat. No. 4,263,874.

BACKGROUND OF THE INVENTION

This invention relates to an improved milking station, and more particularly to a double-acting reed switch capable of indicating when a teat cup assembly has become prematurely disengaged, an improved shut-off valve for use in combination with the teat cup assembly, and an improved teat cup retraction mechanism.

SUMMARY OF THE PRIOR ART

The tendency in modern dairies is to utilize fewer personnel to milk more cows and to place greater reliance on the milking equipment. For example, in a barn with ten milking stalls, ten sets of feeding stantions are commonly used to hold as many as ten cows in place for milking. During a normal milking, it is quite possible for a cow to kick a teat cup assembly loose. When the attendant is rushed, he cannot feel and carefully examine each cow's bag for normal mammary discharge of milk. Consequently, cows can be returned to the field with less than a bag empty condition.

Conversely, and where cows on occasion kick loose the teat cup assembly, there is a tendency to leave the assembly in place overlong and thus overmilk the cow. Overmilking can cause permanent damage to the udder. Premature life to an otherwise valuable dairy animal can result.

Concomitant with teat cup retraction is the need to seal the vacuum line to the retracted teat cup assembly. Heretofore, such valve assemblies have utilized hoses pinched between two anvils. Typically, the hoses, after use over periods of time, have become cracked. Cracking typically occurs on edges of the pinched hose where U-shaped bends occur and repeated closings strain the hose beyond the elastic limit.

Finally, teat cup retraction at the end of milking has presented difficulty. This difficulty includes the teat cup assembly being rapidly withdrawn to the center of the milking station so that either the animal just milked or the animal being led into the adjacent stall is swatted with the heavy teat cup assembly. When this occurs, either the animal or the attendant, can be unnecessarily scared or injured.

OTHER OBJECTS AND ADVANTAGES

An object to this invention is to disclose a metering switch for indicating premature withdrawal of the teat cup assembly from the cow. According to this aspect of the invention, an upwardly flowing milk conduit is provided with a magnetic plug therein. The magnetic plug has excursions between two limits of travel, a lower limit and an upper limit. Assuming normal milk flow stops, the magnet remains in the lower position and actuates a lower reed switch. By timing closure of this switch beyond preset time limits, a normal retraction of the teat cup assembly is cut loose from the cow prematurely, full vacuum is pulled through the teat cups. Assuming full vacuum is pulled, the magnet goes to an upper position where again retraction occurs. In the upper position, however, an indicator light is flashed for the attendant, letting the attendant know that premature disengagement has occurred.

An advantage of this two-position reed switch is that the attendant need no longer examine each cow's bag upon completion of the milking process. Rather, an indication of abnormal milking termination is flashed to the attendant. Consequently, one attendant can handle more cows.

Another object of this invention is to disclose, in combination with the double-acting reed switch in the disclosed invention, a timing circuit. According to this aspect of the invention, the switch when in the lower position indicating the normal stoppage of milk flow is provided with two discrete timers. One timer can be used for slow milking cows, and the other shorter timer for fast milking cows.

Another object of this invention is to disclose an improved shut-off valve for use in combination with teat cup assemblies. A shut-off valve consisting of a hose squeezed between two anvils is positioned between the teat cup assembly and the vacuum manifold to which milk is withdrawn. Inserted within the hose is a T-shaped member. The hose with the T-shaped member is then inserted between opposed anvil members. The T-shaped member at the top of the T spreads the hose walls to an almost closed disposition. In this spread an almost closed disposition, the hose is preflattened for squeezing the anvil mechanisms. Upon flattening, complete shut-off can occur.

An advantage of the anvil member within the hose is improved hose life results. The improved hose life results from the fact that the anvil does not require that the hose be squeezed directly on itself to a tight U-shape configuration where the normal elastic limit of the hose material is exceeded. Rather, the resulting hose closure is a loose U-shape over the interiorly placed anvil which saves the side walls of the hose from fatigue or non-elastic deformation.

An additional advantage of the disclosed shut-off valve as provided by the interior anvil, is that highly sanitized washings as required by the dairy industry can occur.

An additional object to this invention is to disclose an improved milking station teat cup withdrawal apparatus. According to this aspect of the invention, the teat cups with the shut-off valve of this invention are pivotally supported between two adjacent stalls, each stall including a headlock feeding station. The teat cup assembly is pivoted overhead on a pivot having a long length when the teat cup is engaged to the cow and a shorter length when the teat cup is withdrawn. Initial withdrawal of the teat cup is directly upward with only a motion to and toward the head of the animal. This motion causes the teat cup in retraction to move upwardly and away from the cow's bag along a path away from the bag and towards the head of the animal. This upward and away movement avoids animal swatting with the teat cup assembly.

Other objects, features and advantages of this invention will become more apparent after referring to the following specification and attached drawings.

FIG. 1 is a perspective view of a milking stall illustrating the sensor switch, shut-off and teat cup retraction assembly of this invention shown mounted between two adjacent milking stalls;

FIG. 2 is a view of the teat cup support arm in the extended position;

FIG. 3 is a view of the support arm with the teat cup assembly in the retracted position;

FIG. 4(a) illustrates the flow measuring plug in the full-up position as where the teat cup assembly has been kicked loose prematurely and illustrates the shut-off valve in the closed position.

FIG. 4(b) shows the flow measuring plug in the intermediate position with the shut-off valve in the open position as where normal milking occurs;

FIG. 4(c) illustrates the flow measuring plug in the down position with the shut-off valve again in the closed position as where normal milking has ceased;

FIG. 5(a) is a plan view of the novel anvil placed within the shut-off flexible conduit of this invention;

FIG. 5(b) is a side elevation section of FIG. 5(a) taken along lines 5(b)–5(b) with the open position of the conduit which being shown in broken lines;

FIG. 6 is a schematic of the timing diagram of this invention.

Referring to FIG. 1, the general placement of the milking apparatus of this invention between milking stalls A-1, A-2, is illustrated. Specifically, a milk receiving manifold B communicates to a teat cup assembly C. The teat cup assembly has standard vacuum actuated teat cups 14, all draining to a common out-flow manifold 15, with a vacuum line 16 connected to a main vacuum manifold 18. The out-flowing milk then passes to a reed-switch assembly D and a shut-off valve assembly E and then through conduit 20 into the milk receiving manifold. As is standard practice in the dairy industry, milk manifold B is kept under a partial vacuum below atmospheric so that there is a steady withdrawal of milk from the bag 22 of the cow 23 to the milk manifold B.

Each milking station A-1, A-2, has a stantion feeding station for gripping the cow at the head in holding the animal in place. As these stations are standard and well known in the art, they will not be discussed further.

While the cow eats the head is held. In a particular milking barn, it can be understood by the reader that there are as many as ten different stations per attendant. Thus, there would be ten milking stalls with five teat cup assembly C. Typically, each teat cup assembly C is suspended by a line 24 along one side of a cow. By placing the support arm F between the two stalls A-1, A-2 it will be realized that the teat cup assembly will service the two adjacent stalls on either side.

Typically, the cow is ushered into the milking position by the enticement of food being placed within an eating stall. The cow will insert its head right into the stall in order to eat the food. When the head is in position, pair stantions will grip the cow at the head so that withdrawal from the eating stall is not possible.

It can immediately be understood that where one attendant is in charge of ten such stalls and five separate milking stations, even a skilled attendant will be extremely busy. Each cow must be ushered to a proper stall and engaged in the milking station. Cows who have been milked must be released and ushered out the barn door. Getting the sometimes recalcitrant animals away from the feed and surcharges the attendant's duties. Thus, the tendency on the part of modern dairies has become more to rely on the machinery and less to rely on personnel.

Where machinery has been relied on and by way of the prior art, one of the conditions that can occur with some animals is the kicking of the teat cup assembly C loose from the bag 22. Typically, the teat cup assembly will fall to the floor and remain their up until a timer is triggered. Once the timer is triggered, retraction will occur. It is quite possible that during the whole interval of time, the operator may not have any idea of whether retraction occurred because the cow's bag was empty or alternately retraction occurred because the teat cup assembly was kicked loose. Moreover, and in the busy activity of milking numerous cows, the attendant may not have time to feel the cow's bag. This may result with the cow being left with a partially full bag over a period of time. Premature drying up can occur with the necessity that the cow be prematurely calfed.

Alternately, and with an animal that chronically kicks loose a bag, the attendant can have the tendency to overmilk the cow. Overmilking can cause permanent damage to the bag with the result that an otherwise valuable dairy animal is given a premature life.

Having discussed the problems of attendant milking, there will first be discussed the retraction of the teat cup assembly C by rope 24 actuated by support mechanism F. Secondly, action of the reed-switch and shut-off valve will be set forth with respect to the FIGS. 4(a), 4(b), 4(c) and 5(a) and 5(b). Finally, the timer circuit of FIG. 6 will be discussed illustrating how the improved milking station of this invention operates.

Referring to FIG. 2, the suspension mechanism F is illustrated for withdrawing line 24 attached to the teat cup assembly C. Line 24 constitutes the tensive support for the teat cup assembly C. Specifically, a cable retracting double-acting cylinder 30 gathers a cable 31 into and out of cylinder 30 in response to air flow into conduits 32, 33. The double acting cylinder 30 has the cable 31 reeved around a first sheave 35 and passed to a second sheave 36. From sheave 36 the cable is attached to a traveling car 38.

Car 38 rides on a rod 40. When the teat cup assembly C is lowered, car 38 is in the position shown in FIG. 2, moved outward to the extremity of suspension mechanism F. When the teat cup assembly is fully retracted to an upward position between the two stalls, car 38 is shown in the position of FIG. 3, and moved to a position between the stalls at the forward portions of the cows typically adjacent the cows' shoulders.

Line 24 passes through a sheave 51 on car 38. From sheave 51, line 24 passes through a second sheave 52 at the remote end of the support F, is fastened to a shaft cross board on a U-shaped member at the far end of the support arm F. The bitter end of the rope 24 fastens back on car 38 at 24(a).

Typically, the support member F is pivotal about a vertical axis 55. Pivoting can occur between stall A-1 and A-2.

Having set forth the parts of the support arm F its function can now be explained with respect to FIGS. 1-3.

Typically, and upon installation of the teat cup assembly to the bag of the cow, the teat cup assembly C is grasped and pulled so that travelling of car 38 on rod 40 occurs to the fully outward position shown in FIG. 2. Typically, under force exerted by the attendant, rope 24 as wound about respective sheaves 51, 52, is pulled away from the support arm F as the teat cup assembly C is pulled to the bag of the cow 22 and plugged in by the attendant.

Returning to FIG. 1, retraction of the teat cup assembly C, can now be understood. Specifically, car 38 will move in the direction of arrow 60. As such movement occurs, the teat cup assembly will be seen to move upwardly and at the same time inwardly to a position between the respective feeding stations A-1 and A-2.

Thus, the movement will be upward and away from the bag of the cow and towards the head of the animal. A tendency of the teat cup assembly to swat or hit the cow being milked is not present. Moreover, the teat cup assembly C in retraction at the end of line 24 will not whip or snap so as to hit the animal in the adjacent stall. Further, the retracted path of the teat cup assembly forward and to the side of the animal being milked will prevent the attendant from being hit with the teat cup assembly. Improved retraction results.

Having set forth the retracting function of the teat cup assembly, attention will be devoted to the reed-switch first and the shut-off valve second. Thereafter, and with reference to the timing diagram shown in FIG. 6, operation of the entire unit.

Referring to FIG. 4(a), a hose 62 connects about a cylinder 63. Cylinder 63 terminates in a sanitary flange connector 64. A sanitary flange connector is of standard design and it will not be further discussed herein. The opposite side of the sanitary flange connector 64, includes a second conduit portion 65.

Within the cylindrical passageway defined by conduits 63, 65, there is provided a magnetic plug 66. Plug 66 is enclosed within a plastic member. Dimensions to suit can be selected. This will be a function of the type of cow, volume of milk flow and the like. By way of example, some possible dimensions are herein given.

The magnet has an overall excursion between a first stop 69 in upper conduit 65 and a second stop 67 in lower conduit 63. The total distance between the respective stops 69 and 67 is three inches.

The magnetic plug itself is one and one half inches in length. The plug is 9/16 inches in diameter including the plastic coating about the inner-magnetic core. Conduit 63, 65 in which the magnet travels is 7/8 inches in diameter. Typically, the conduits and all parts are made out of stainless steel of the non-magnetic variety.

Adjacent stainless steel conduit 65 there is provided a second stainless steel tube 70. Interior of tube 70, there is inserted a double pole reed switch schematically illustrated at normally open contracts 71(a) and 71(b). When magnet 66 is in the upper position as shown in FIG. 4(a), the reed switch is closed at 71(a) and opened at 71(b). (See FIG. 4(a)). When the magnet 66 is at the lower position shown in FIG. 4(c), reed switch is closed at 71(b) and opened at 71(a). When the magnet is intermediately located as shown in FIG. 4(b), neither reed switch 71(a) or 71(b) is closed.

The position of magnet 66 is a function of how the teat cup assembly C is disconnected from the bag 22 of the cow. It may be readily understood.

First, where the teat cup assembly C is kicked loose, the vacuum manifold B pulls a full vacuum through the conduit from the teat cup assembly C through the valve mechanism D into the conduit B. Where the conduit 15 has full vacuum drawn through it, the plug 66 moves to the full upward position. In this position, the reed-switch at 71(a) closes.

Where normal milk flow from the bag of the cow 22 into conduit B occurs, magnet 66 tends to migrate to the medial position. Although, the magnet may vibrate upwardly and downwardly in milk flowing through the conduit, on average it is in a position between the reed-switches 71(a)-71(b). In this intermediate position, neither of the reed-switches 71(a), 71(b) is constantly closed. The normal milking sequence is called for by the reed switches being both in the open position. (See FIG. 4(b)).

With respect to FIG. 4(c), where the teat cup assembly C is plugged to the cow's bag 22, but the normal flow of milk has stopped, magnet 66 will sink to the lower position. In this lower position, reed reed switch 71(b) is closed.

Having set forth the function of the reed-switch under various milk-flow conditions, attention will now be devoted to the improved shut-off valve. First, overall construction of the shut-off valve as shown in FIG. 4(a) will be discussed. Next, with reference to FIGS. 5(a) and 5(b), the improved closure mechanism within a flexible hose will be set forth. Finally, and with respect to FIG. 6, the overall operation of the improved milking station will be set forth.

Referring to FIG. 4(a), a spring-biased pneumatic cylinder 80 having an actuated rod 81 is illustrated. Actuating air is received in the cylinder at conduit 82. When air is received, rod 81 extends from the piston to and towards a rubber conduit 85.

Typically, rubber conduit is placed within a rectangular and enclosed housing 86. Housing 86 has a first cylindrical member 87 at one end, a second cylindrical member 88 at the opposite end. Hose 85 is fitted over these respective cylindrical members and spans the interior of the housing between the cylindrical members.

Turning on and off of the respective flow from the teat cup assembly C is provided by pinching hose 85 between anvil members 91, 92. Anvil member 91 is affixed to one of the sides of enclosing box 86. It provides a stationary member against which hose 85 is pinched to a close position.

A second anvil member 92 is hinged at a hinge bar 93. As hinged from bar 93, it extends upwardly to a position of opposition to anvil member 91. When rod 81 extends outwardly from piston 80, the hose disposed between the respective anvil members 85 is pinched. It is typically pinched to a completely closed position.

The improvement of this invention relies in placing a T-shaped interior anvil member 100 within the hose 85. Typically, the T-shaped member has a first portion 101 protruding inwardly of conduit member 88. As protruding inwardly of conduit member 88, the T-shaped member 100 is held at the broadest portion of the "T" 102 intermediately between the respective conduit portions 88, 87.

Anvil member 100 functions to prevent the pinching of hose 85 from causing premature hose failures. Specifically, and with reference to FIG. 5(b), it can be seen that when the respective anvil members 91, 92 pinch downwardly about anvil member 100, the sidewalls of the hose 85 can form immediately about the inner anvil member 100. As the sidewalls of the hose 85 form about the inner anvil member 100, milk flow is completely blocked.

Conversely, when the anvil members 91, 92 are opened, the sidewalls of the rubber hose at portions 85' extend upwardly and away from the anvil member 100. As extending upwardly and away, the free passage of fluid, such as milk, can occur about the anvil member 100.

It should also be stressed that when housing 86 is open, the hose 85 can be simply removed. During such removal, the anvil member 100 can be removed from the hose and thoroughly cleaned.

Having set forth the construction of the valve assembly, operation of the improved milking station can now be discussed.

Typically, the teat cup assembly C is withdrawn from a stored position and placed to and plugged into the bag of the cow. In this position, magnetic plug 66 assumes the position shown in FIG. 4(b). It will be remembered that the plug occasionally migrates against bar 69 in the upper limited travel or against bar 67 in the lower limited travel. Thus, on occasion reed switches 71(a), 71(b) may be closed, but such closures will only be for a short period of time.

Assume that during milking, the cow kicks teat cup assembly C loose from its bag 22. When this occurs, plug 66 will migrate to the full upward position shown in FIG. 4(a). Assuming that the plug stays in this position for a period in the order of five seconds, timer 110 will run. When timer 110 runs, flashing indicator 112 will come on. At the same time a retract signal will be sent by conventional solenoid mechanisms to cable cylinder 30. Retraction of the teat cup assembly C will occur. At the same time, the shut-off valve E will be actuated. Air through lead 82 will actuate plunger 81 to move anvils 92, 91 toward one another in pinching contact. Compression of the hose over the anvil member 100 will occur. Sealing of the vacuum manifold B from the loose teat cup assembly will occur.

The attendant will see the flashing indicator 112. He will know that the particular cow just having discharged the teat cup assembly C has less than an empty bag. By replugging of the teat cup assembly C normal milking will recommence.

Upon drainage of the cow's bag, and as indicated in FIG. 4(c), plug 66 will fall against the lower limit of travel bar 67. Reed switch 71(b) will close for the preset period of time on either timer 114 or timer 116. These timers will initiate the retract and shut-off sequence.

It will be noted that timers 114, 116 are provided with a switch 118 whereby either of the timers may be selected. This alternate selection of the respective timers can be utilized for short milking cows and for long milking cows. For example, some cows bags empty in such a fashion that where flow is interrupted for a period of approximately three seconds, milking should cease.

Other cows' bags typically drain slower. This being the case, interruptions of up to six seconds can be tolerated before milking should cease. By simply throwing switch 118, the attendant can tailor the draining characteristics of the improved milking stages of the invention to propensities of the particular cow's bag being milked.

It will be appreciated that modifications can be made to the milking space station without departing from the spirit of this invention.

What is claimed is:

1. In a milking station having first and second stations for holding first and second side-by-side cows to said first and second milking stations and a teat cup assembly for milking cows at both said stations and means for retraction of said teat cup assembly from both of said milking stations; the improvement in said retraction means including:

a retraction arm medially pivotable along a vertical axis at a pivot support between said stalls adjacent and between the head portions of said first and second cows, said arm extending horizontally to a position overlying and along side of the bags of said cows;

a tensive support member extending between the outward end of said arm and said teat cup assembly for retracting said teat cup assembly from a milking position underneath said cow; and means for retracting said teat cup assembly operatively connected to said tensive support member and attached to said arm for movement along said arm, said means for retracting causing upward and inward simultaneously movement of said teat cup assembly from a milking position at or near the bag of said cow to a storage position between said milking stations.

2. The milking station of claim 1 and wherein means for retracting include a car moveable along said arm and gathering means for gathering said tensive support to said car when said car moves from the outer end of said support to the inner end of said support.

* * * * *